(12) United States Patent
Gowri-Shankar

(10) Patent No.: US 8,289,447 B1
(45) Date of Patent: Oct. 16, 2012

(54) CADENCE DETECTION FOR FILM MODE DE-INTERLACING

(75) Inventor: Vivek Gowri-Shankar, Wheatley (GB)

(73) Assignee: Altera Corporation, San Jose, CA (US)

( * ) Notice: Subject to any disclaimer, the term of this patent is extended or adjusted under 35 U.S.C. 154(b) by 599 days.

(21) Appl. No.: 12/502,673

(22) Filed: Jul. 14, 2009

(51) Int. Cl.
*H04N 11/20* (2006.01)
(52) U.S. Cl. ........................................ 348/448; 348/441
(58) Field of Classification Search .................. 348/700, 348/456, 441, 448, 451–452, 459, 554–556, 348/558, 699, 701, 449; *H04N 11/20*
See application file for complete search history.

(56) References Cited

U.S. PATENT DOCUMENTS

| | | | |
|---|---|---|---|
| 6,519,005 B2 * | 2/2003 | Bakhmutsky et al. | ..... 348/415.1 |
| 6,563,550 B1 * | 5/2003 | Kahn et al. | ..... 348/700 |
| 6,931,595 B2 * | 8/2005 | Pan et al. | ..... 715/723 |
| 8,031,265 B2 * | 10/2011 | Capps | ..... 348/448 |
| 2007/0296858 A1 * | 12/2007 | Eymard et al. | ..... 348/456 |

* cited by examiner

*Primary Examiner* — Trang U Tran
(74) *Attorney, Agent, or Firm* — Mauriel Kapouytian & Treffert LLP; Avarat Kapouytian

(57) ABSTRACT

A method of estimating the interlacing mode used in a series of video frames presented as a sequence of fields is described. In one implementation, the method includes calculating a metric indicative of the difference between a current field of the sequence and a previous field of the sequence and determining from the metric so calculated the most likely type of the current field by reference to a Hidden Markov Model.

18 Claims, 4 Drawing Sheets

US 8,289,447 B1

CADENCE DETECTION FOR FILM MODE DE-INTERLACING

BACKGROUND

Video signals can be classified as either progressive or interlaced. In a progressive video signal, video frames are displayed sequentially, with horizontal lines of pixels that make up the frame being displayed line by line from top to bottom. In an interlaced signal, each frame is split into two fields which are displayed in turn. One field contains the top line of the frame and every second subsequent line, whilst the other field contains the second line from the top and every second subsequent line. When an interlaced video signal is displayed, the fields are displayed sequentially, with the second field of each frame being displayed very shortly after the first field.

Interlaced video relies on the fact that pixels of a display apparatus continue to emit light for a short period (known as the decay period) after their stimulus has been removed to create the illusion that one complete frame is being displayed at a time, as the first field displayed remains visible for a period whilst the second field is displayed.

Interlaced signals can be displayed without difficulty on a cathode ray tube (CRT) based display apparatus such as a CRT television set. However, more modern technologies such as liquid crystal display (LCD) and plasma screens cannot directly display interlaced video signals, and thus a de-interlacing process, in which the interlaced video signal is converted to a progressive video signal, is required to display interlaced video signals on such apparatus.

The de-interlacing process used depends upon the original format of the interlaced video signal. For example, the interlaced video signal may have been recorded in interlaced format originally (true interlaced), or may have been recorded in a progressive format and subsequently converted into interlaced format for broadcast. Different de-interlacing modes are required to de-interlace these different types of interlaced video signals.

The situation is further complicated by the fact that different interlacing techniques (known as cadences) may be used to convert a progressive video signal to interlaced format. In one example, which is illustrated in FIG. 1, a progressive frame 10 is converted into first and second interlaced fields 12 and 14, with the first field 12 including the top line and every subsequent second line of the progressive frame 10, whilst the second field 14 includes the second line from the top of the progressive frame 10 and every subsequent second line. However, different cadences are employed for different purposes. For example, films are typically recorded at 24 frames per second in progressive format, whereas the National Television System Committee (NTSC) television standard requires a display rate of 60 fields per second. Thus, to convert a film recorded at 24 frames per second in progressive format to interlaced NTSC format a 3:2 cadence is used to spread the 24 frames in each second of the original progressive signal over 60 fields. This is illustrated in FIG. 2, which shows a two-frame progressive video sequence 20 being interlaced using a 3:2 cadence. A first frame 22 of the sequence is converted into three interlaced fields 24, 26 and 28, one of which (the third field 28 in this example) is a duplicate of another of the fields (the first field 24 in this example), and the second frame 30 is converted into two different interlaced fields 32 and 34. Alternate frames of the progressive video sequence 20 are converted into three or two interlaced fields, such that for every 24 frames of the original progressive video signal 60 interlaced fields are produced.

Alternative cadences are also prevalent, such as 2:2:2:2:2:2:2:2:2:2:3 or 2:2, which are used for converting 24 frames per second progressive films to 50 fields per second interlaced Phase Alternate Line (PAL) standard video.

A problem arises in de-interlacing an interlaced video signal when thu interlaced video signal contains different formats of interlaced video. For example, a television broadcast may include program segments which were originally recorded in interlaced format and advertisement segments which were originally recorded in progressive format and converted to interlaced format. Additionally, different cadences may have been used for different interlaced segments of the signal. De-interlacing modes designed for true interlaced content (i.e., video signals which were recorded in interlaced format, rather than being converted from a progressive format) do not perform well on converted progressive content. Thus, different de-interlacing modes are required to achieve satisfactory de-interlacing of each different type of interlaced video signal, and it is important that any decoding or display apparatus is able to switch between these different modes at run-time.

Techniques exist to allow run-time switching between de-interlacing modes, typically involving calculating a metric indicative of the difference between adjacent fields of a video sequence, which metric is then compared to a threshold to determine the type of interlaced sequence that is present. A suitable de-interlacing mode is then selected, and the decoding or display apparatus "locks in" to that mode to avoid switching between de-interlacing modes when a static sequence of images is detected. However, in some cases the selected de-interlacing mode may not be appropriate for the whole of a video sequence, which can lead to poor performance and the appearance of artifacts in the sequence when it is displayed.

SUMMARY

An embodiment of a first aspect of the invention provides a method of estimating the interlacing mode of a series of video frames presented as a sequence of fields, the method including calculating a metric indicative of the difference between a current field of the sequence and a previous field of the sequence and determining from the metric so calculated the most likely type of the current field by reference to a Hidden Markov Model.

Embodiments of the method of the present invention overcome the poor performance that can occur with prior art systems by facilitating a dynamic, run-time indication of the most likely field type of any given video field in a sequence. Embodiments of the method are able to detect changes in the interlacing mode of a sequence of video fields, thus permitting a suitable de-interlacing mode (for example, an algorithm for true interlaced content or an algorithm for progressive content with a cadence) to be selected dynamically for each video field in the sequence, thereby alleviating the artifacts and other problems caused by the use of an inappropriate de-interlacing mode.

The metric indicative of the difference between a current field of the sequence and a previous field of the sequence may be a function of the difference between the current field and the previous field and the difference between the current field and a corresponding field of a previous frame of the series.

For example, the metric may include a ratio of the difference between the current field and the previous field and the difference between the current field and the corresponding field of the previous frame of the series.

The Hidden Markov Model may be configured with transition probabilities based on a priori knowledge of a sequence of video frames.

Alternatively, the Hidden Markov Model may be configured to learn transition probabilities from a known training sequence of video frames.

The probability that the current field is of a given type may be calculated by performing a forward algorithm.

Alternatively, a decision that the current field is of a given type may be made by determining a most likely hidden path through the Hidden Markov Model given an observed sequence of difference values.

Embodiments of the method may further include comparing a stored future field of the sequence with a current field of the sequence.

Embodiments of the method may further include calculating the probability that the next field of the sequence will be of a given type.

An embodiment of a second aspect of the invention provides a machine readable medium containing instructions for causing data processing equipment to perform a method according to the first aspect.

An embodiment of a third aspect of the invention provides apparatus for estimating the interlacing mode of a series of video frames presented as a sequence of fields, the apparatus including a field comparator for calculating a metric indicative of the difference between a current field of the sequence and a previous field of the sequence and a field type selector for determining from the metric so calculated the most likely type of the current field by reference to a Hidden Markov Model.

The field comparator may be configured to calculate a function of the difference between the current field and the previous field and the difference between the current field and a corresponding field of a previous frame of the series.

For example, the field comparator may be configured to calculate a ratio of the difference between the current field and the previous field and the difference between the current field and the corresponding field of the previous frame of the series.

The Hidden Markov Model may be configured with transition probabilities based on a priori knowledge of a sequence of video frames.

Alternatively, the Hidden Markov Model may be configured to learn transition probabilities from a known training sequence of video frames.

The field type selector may be configured to perform a forward algorithm to calculate the probability that the current field is of a given type.

Alternatively, the field type selector may be configured to determine a most likely hidden path through the Hidden Markov Model given an observed sequence of difference metrics to make a decision that the current field is of a given type.

Embodiments of the apparatus may further include a frame buffer for storing a future field of the sequence.

Embodiments of the apparatus may further include a field type predictor for calculating the probability that the next field of the sequence will be of a given type.

An embodiment of a fourth aspect of the invention provides a field programmable gate array (FPGA) implementing an apparatus according to the third aspect.

An embodiment of a fifth aspect of the invention provides a de-interlacer including an apparatus according to the third aspect.

BRIEF DESCRIPTION OF THE DRAWINGS

The novel features of the invention are set forth in the appended claims.

However, for purpose of explanation, several aspects of particular embodiments of the invention are described by reference to the following figures.

DETAILED DESCRIPTION

The following description is presented to enable any person skilled in the art to make and use embodiments of the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
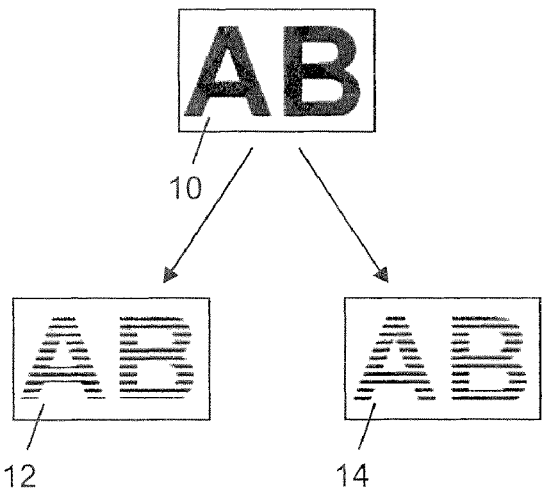
FIG. 1 is a schematic diagram illustrating the principle of interlaced video.
Figure 2:
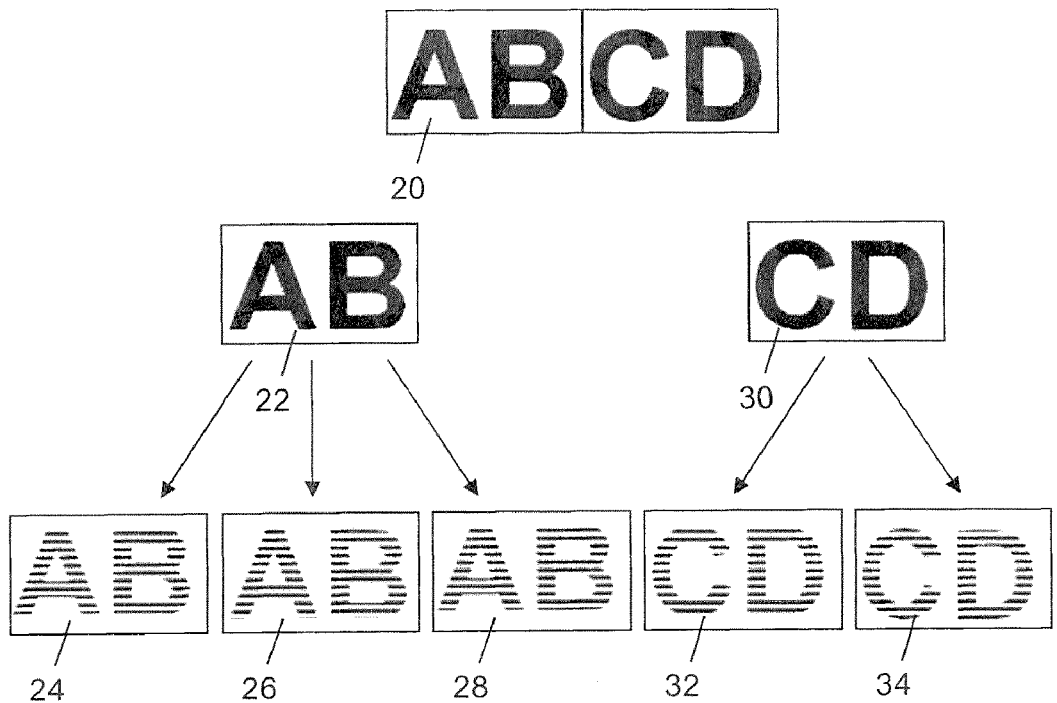
FIG. 2 is a schematic diagram showing a progressive video stream being converted into 3:2 cadence interlaced video.
Figure 3:
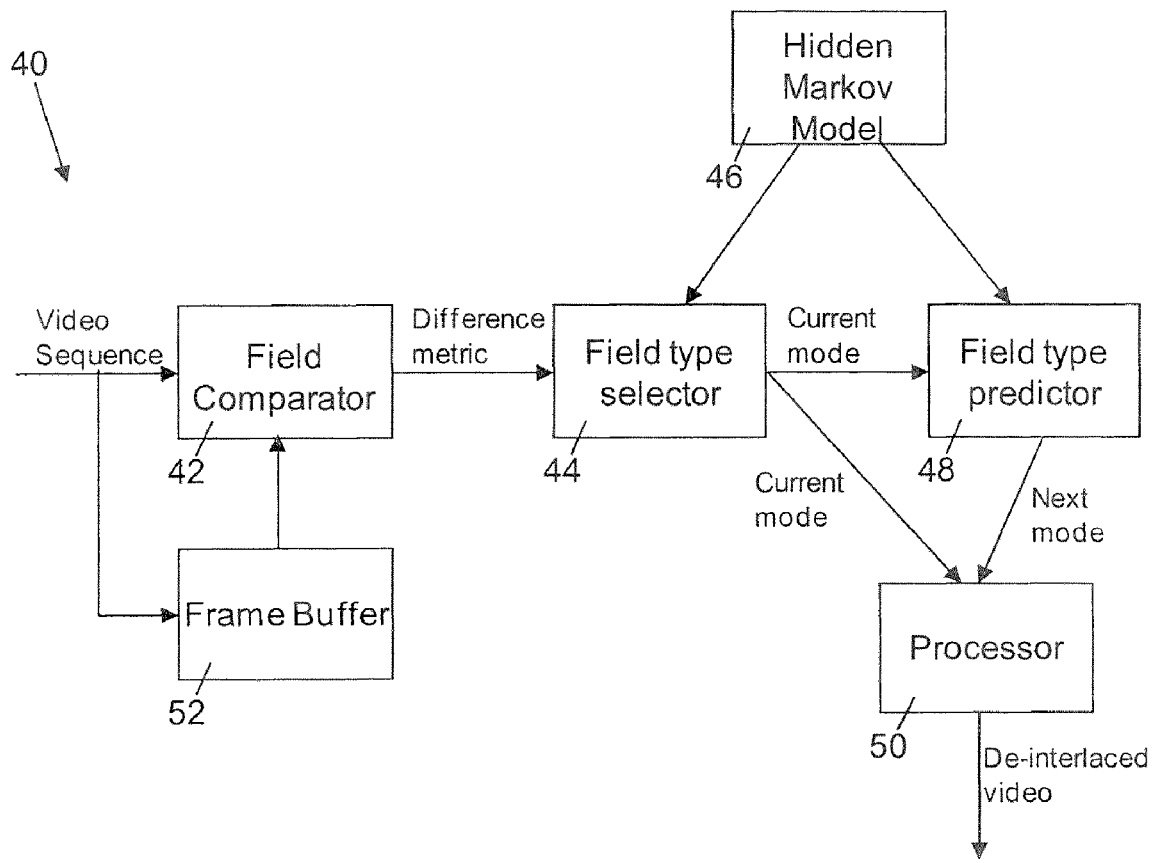
FIG. 3 is a schematic diagram showing a representative architecture of a de-interlacing apparatus.

Referring first to FIG. 3, an exemplary architecture for a de-interlacer is shown generally at 40. It is to be understood that the elements shown in FIG. 3 are representative of functional blocks of a de-interlacer, and do not necessarily represent actual physical components of a de-interlacer.

The de-interlacer 40 includes a field comparator 42 which is operative to compare a current field and one or more previous fields of a received sequence of interlaced video frames. The field comparator 42 generates a metric which is indicative of the difference (or similarity) between the compared fields. As is known to those skilled in the art, the difference between fields in a sequence of interlaced video frames can give a useful indication of the field type of the current field. For example, if there is very little difference between the current field and a corresponding field of the previous frame, this may be an indication that the current field is a repeated field. Conversely, if there is a large difference between the current field and the previous field, this may indicate that the current field is the first field of a new frame.

The difference metric may be calculated in a number of ways. For example, the difference metric may be a numerical value calculated by correlating the current and previous fields. Alternatively, the difference metric may be a function of the difference between the current and previous fields and of the difference between the current field and the previous corresponding field. For example, the metric may be a two-dimensional quantity formed from the difference between the current field and the previous field and from the difference between the current field and the first field of the previous frame. In one simple example, the difference metric may be a ratio of the difference between the current and previous fields to the difference between the current field and the previous corresponding field. However, the method of calculating the difference between the current and previous fields, or between the current field and the corresponding field of a previous frame, is not of particular relevance to the present invention, and it will be appreciated by those skilled in the art that any suitable method could be employed.

The difference metric is passed by the field comparator 42 to a field type selector 44, which identifies the most likely field type of the current field of the received video sequence based on the difference metric and informed by a Hidden Markov Model (HMM) 46, which is described in detail below.

The field type selector 44 passes a signal which is indicative of the most likely field type of the current frame of the received sigma to a field type predictor 48, which predicts the most likely field type of the next field in the received video sequence based on the current field type signal generated by the field type selector 44 and informed by the HMM 46, as will be described below.

The field type predictor 48 passes a signal indicative of the most likely field type of the next field to a processor 50. The signal generated by the field type selector 44 indicating the most likely field type of the current field is also passed to the processor 50. The processor 50 is configured or programmed to determine, from the signal received from the field type selector 44, the current interlacing mode of the received video sequence, select an appropriate de-interlacing technique and de-interlace the received interlaced video sequence to produce at an output of the processor 50 a de-interlaced video sequence. The processor 50 may also use the signal received from the field type predictor 48 in determining the current interlacing mode and in selecting an appropriate de-interlacing technique.

The de-interlacer 40 shown in FIG. 3 employs a Hidden Markov Model (HMM) 46, which may be pre-programmed into the processor 50. The HMM 46 enables the field type selector 44, the field type predictor 48 and the processor 50 to make decisions on the most likely current field type, the most likely next field type and the most likely interlacing mode used in the received video sequence.

By way of background, a Hidden Markov Model is a statistical model in which the system being modelled has a number of states, which are not directly visible to an observer. However, variables which are influenced by the states (known as observations) are directly visible. Given a set of basic parameters of the system being modelled, an HMM can be used to calculate the probability of a given sequence of observations, or to calculate the most likely sequence of hidden states, given a sequence of observations.

Figure 4:
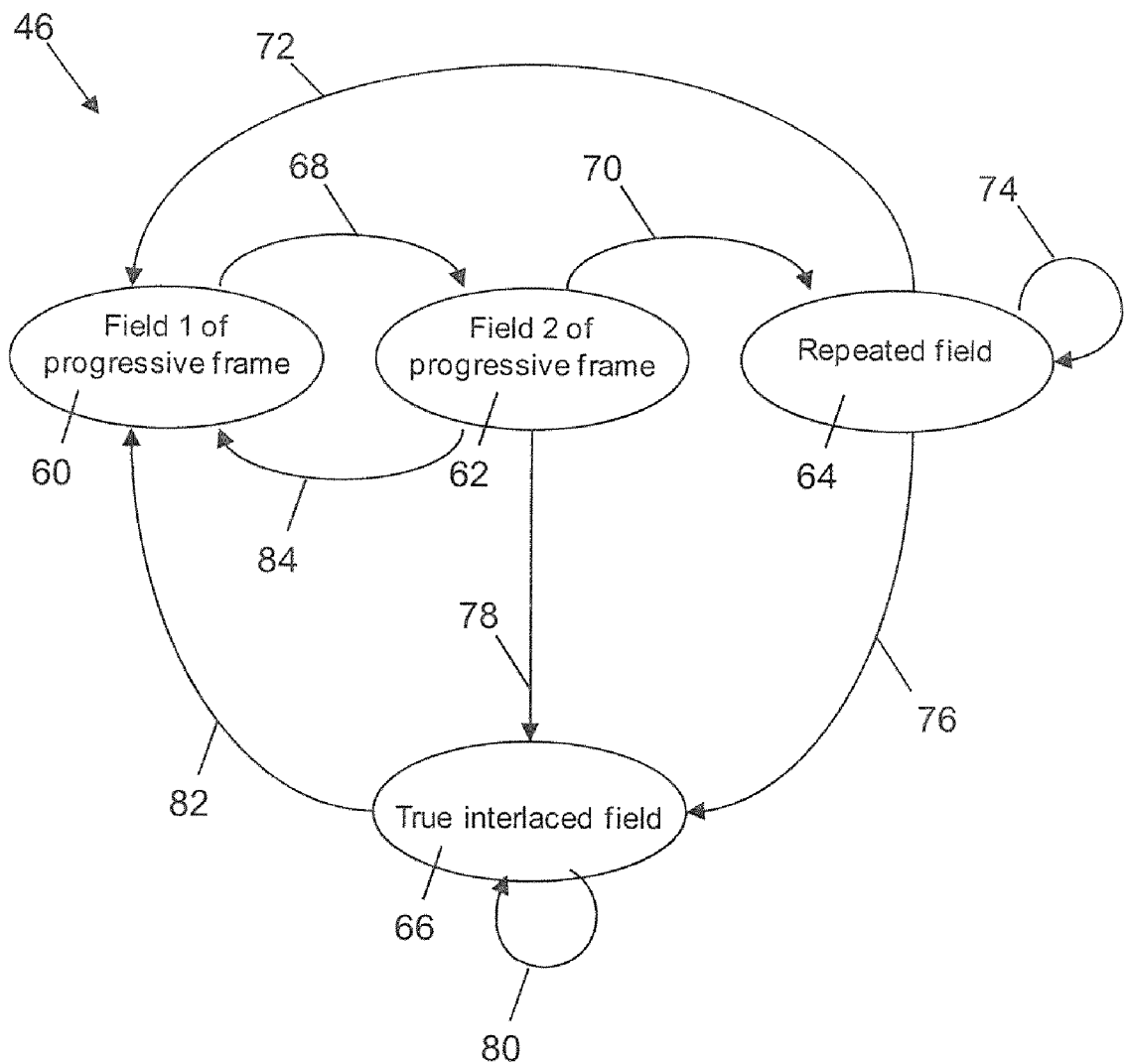
FIG. 4 is a schematic diagram showing a Hidden Markov Model used to predict the state of fields in a video stream.

FIG. 4 illustrates an exemplary HMM 46 for use in the de-interleaver 40 shown in FIG. 3. In this model, the current video field may be in one of four possible hidden states: the first field of an interlaced progressive frame, indicated by reference numeral 60; the second field of an interlaced progressive frame 62; a repeated field 64; or a true interlaced field 66. It is not known which of these states the current video field occupies. Thus, these states are hidden.

The field comparator 42 produces a sequence of difference metrics, which sequence can be observed. Thus, the sequence of difference metrics constitutes the observations of the HMM 46.

The HMM 46 also includes information on the probability of transitions between the particular field types 60-66. These transition probabilities are represented by the arrows 68-82 in FIG. 4. The transition probabilities may be specified using a priori knowledge, such as the length of the sequence of video frames being processed, the frame or field rate ratio between different cadences, and the ratio of 3:2 cadence content to 2:2 cadence content in a particular sequence of video frames. For example, in the HMM 46 illustrated in FIG. 4, there are four possible states 60, 62, 64, and 66, and the probability of transitions between the states 60-66 can be estimated from general knowledge of video frame sequences. If the current field is the first field of a progressive video frame (i.e., occupies state 60), the next field will always be the second field of the progressive video frame (i.e., will occupy state 62). Thus, the transition probability 68 that the next field will occupy state 62, given that the current field occupies state 60, is 1.

If the current field is the second field of a progressive video frame (i.e., occupies state 62), there are three possible states for the next field. In cadences such as 2:2, the second field of a video frame is followed by the first field of the next frame. The cadence of the sequence of video fields is unknown, and thus the transition probability 84 that the next field will be the first field of a new frame (i.e., will occupy state 60) can be estimated as being between 0 and 1, and the value of the transition probability 84 will be based upon knowledge of the type of sequence of video frames that is being processed.

In cadences such as 3:2, the first field of a video frame is sometimes repeated, to 'pad' the interlaced sequence. Thus, there is a possibility of a transition from state 62 (second field of a progressive frame) to state 64 (repeated field). Again, the cadence of the video sequence being processed is unknown, so the transition probability 70 can be estimated as being between 0 and 1, with the value of the transition probability 70 being based on knowledge of the type of sequence of video frames being processed. For example, if the only cadence expected is 3:2, the transition probability 70 may be set as 0.5.

It is possible that the sequence of video frames being processed will contain fields of true interlaced content. These typically start after the second field of a progressive frame or after a repeated field. Thus, there are two transition probabilities 76 and 78, that if the current field occupies state 62 (second field of a progressive frame), the next field will occupy state 66 (true interlaced field), and that if the current field occupies state 64 (repeated field), the next field will occupy state 66 (true interlaced field). However, these transitions are rare in most video sequences, and thus a very low value may be selected for the transition probabilities 76 and 78.

It will be apparent that the sum of the transition probabilities exiting a given state must equal 1. In the example given above, the transition probability 84 may equal 0.6, the transition probability 70 may equal 0.3 and the transition probability 78 may equal 0.1.

If the current field is a repeated field (i.e., occupies state 64), the next field will either be the first field of a progressive frame (state 60) or will be another repeated field (state 64). Thus, transition probabilities 72, 74 can be calculated, based on knowledge of the video sequence being processed, or general knowledge, to reflect the probability of these transitions occurring. Similarly, transition probabilities 80 and 82 are calculated for transitions between state 66 (interlaced field) and state 66 (interlaced field) and between state 66 (interlaced field) and state 60 (first field of a progressive frame).

Alternatively, the transition probabilities 68-82 may be learned using training sequences of video frames in which the exact sequence of field types is known. This learning may be achieved using expectation-maximisation (Baum-Welsh) training techniques, which will be familiar to those skilled in the art.

The HMM 46 also includes a set of parameters $\{\pi_S\}$, which are the probabilities of the first field of a sequence occupying each one of the states 60-66. Given the structure of the HMM 46, a set $\lambda$ of parameters (which parameters are transition probabilities and a probability distribution of the initial state) and the observed sequence of difference metrics, the processor 50 can calculate the most likely states (field types) of the current and next fields, and thus select an appropriate de-interlacing technique to use to de-interlace the sequence of video frames, as will be described below.

The HMM 46 can be used to determine the probability of a given sequence of observations, given the set of parameters λ, i.e., $P(O_1, O_2, \ldots O_n|\lambda)$, where $O_1, O_2, \ldots O_n$ is the observed sequence of difference metrics.

The HMM 46 can also be used to determine the most likely hidden path, given a sequence of observations, i.e., $\max[P(h_1, h_2 \ldots h_n|O_1, O_2, \ldots O_n, \lambda)]$, where $h_1, h_2, \ldots h_n$ is the sequence of states traversed to arrive at the current state and $O_1, O_2, \ldots O_n$ is the observed sequence of difference metrics.

The processor 50 is configured to perform a forward algorithm through the HMM 46 to determine the most likely state at a given iteration n (i.e., point in the sequence of fields), that is to say the most likely field type of the current field in the received sequence. This is achieved by calculating, for each of the possible hidden states, the probability that the current field occupies that state, i.e., $P(h_n=s|O_1, O_2, \ldots, O_n, \lambda)$, where s is a given hidden state (field type), $h_n$ is the state at iteration n, and $O_1, O_2, \ldots, O_n$ is the observed sequence of difference metrics. The hidden state with the highest probability can then be selected as the most likely field type of the current field.

Defining the forward variable $\alpha_{n,s}=P(h_n=s, O_1, O_2, \ldots, O_n|\lambda)$, (where n is the current iteration and s is a given hidden state), the set of transition probabilities t(s,s') between two hidden states s and s' of the HMM 46 and the emission probability e(O|h=s) (which is the probability of a given observation which in this case is a given difference metric) given the current hidden state, the forward variable for iteration n+1 can be deduced from the value of the forward variable at iteration n, as follows:

$$\alpha_{n+1,s'}=P(h_{n+1}=s',O_1,O_2,\ldots,O_n,O_{n+1}|\lambda)$$

$$=P(O_{n+1}|h_{n+1}=s',O_1,O_2,\ldots O_n,\lambda) \times P(h_{n+1}=s',O_1, O_2, \ldots, O_n|\lambda)$$

$$=e(O_{n+1}|h_{n+1}=s') \times \Sigma_s P(h_{n+1}=s',h_n=s,O_1,O_2,\ldots,O_n|\lambda)$$

$$=e(O_{n+1}|h_{n+1}=s') \times \Sigma_s [P(h_{n+1}=s'|h_n=s,O_1,O_2,\ldots,O_n,\lambda) \times P(H_n=s,O_1,O_2,\ldots,O_n|\lambda)]$$

$$=e(O_{n+1}|h_{n+1}=s') \times \Sigma_s [t(s,s') \times \alpha_{n,s}]$$

The forward variables are initialised with initial state probabilities $\alpha_{0,s}=\pi_s$.

In order to determine the most likely state (field type) at a given iteration n, the processor 50 calculates the forward variables as specified above and determines the probability of each of the possible states at iteration n, given the observed sequence O and the general set of parameters λ:

$$P(h_n=s|O_1,O_2,\ldots,O_n,\lambda) = \frac{\alpha_{n,s}}{P(O_1,O_2,\ldots,O_n|\lambda)} = \frac{\alpha_{n,s}}{\sum_h \alpha_{n,h}}$$

The hidden state s having the highest probability can then be selected as the most likely field type of the current field.

The processor 50 may calculate the most likely state (field type) at the next iteration n+1 before observation $O_{n+1}$ is observed:

$$P(h_{n+1}=s'|O_1,O_2,\ldots,O_n,\lambda)=\Sigma_s[t(s,s') \times P(h_n=s|O_1, O_2, \ldots, O_n,\lambda)]$$

The hidden state s' having the highest probability can then be selected as the most likely field type of the next field.

This calculation is simplified in that the conditional probabilities of interest are all directly proportional to the corresponding forward variables.

In an alternative embodiment, the HMM 46 can be used to determine the most likely hidden path given the sequence of observations, i.e., $$\max[P(h_1,h_2 \ldots h_n|O_1,O_2, \ldots O_n, \lambda)].$$

This is known as the "decoding problem", and can be solved using the Viterbi algorithm. The use of the Viterbi algorithm to solve the decoding problem is well known to those skilled in the relevant art, and thus will not be described here. The value so calculated can be used to inform a decision on the most likely type of the current field of the sequence.

The example described above is a simple case in which only one previous state is used to determine the likely next state. A more complex model could be used, in which more than one previous state is used to determine the likely next state.

The reliability of the method described above can be improved by examining "future" observations by storing a number of frames of a received sequence in a frame buffer 52, such that the likely field type of a field which appears after the field currently being processed in the sequence can be determined using the forward-backward algorithm, and thus the current field can more accurately be determined.

It will be appreciated that while the de-interlacer 40 has been described above in terms of functional blocks, it could be implemented in a variety of ways, for example as a circuit made up of discrete electronic components, in a suitably programmed processor or field programmable gate array (FPJA), or as a computer program stored on a machine readable medium (e.g., a computer readable medium) such that when executed the computer program causes a computer to perform the method described above. The computer readable medium is any data storage device that can store data, which can thereafter be read by a computer system. Examples of the computer readable medium include hard drives, network attached storage (NAS), read-only memory, random-access memory, compact disc read-only memory (CD-ROM), compact disc recordable (CD-R), compact disc rewritable (CD-RW), magnetic tapes, and other optical and non-optical data storage devices. The computer readable medium can also be distributed over a network-coupled computer system so that the computer readable code is stored and executed in a distributed fashion.

Figure 5:
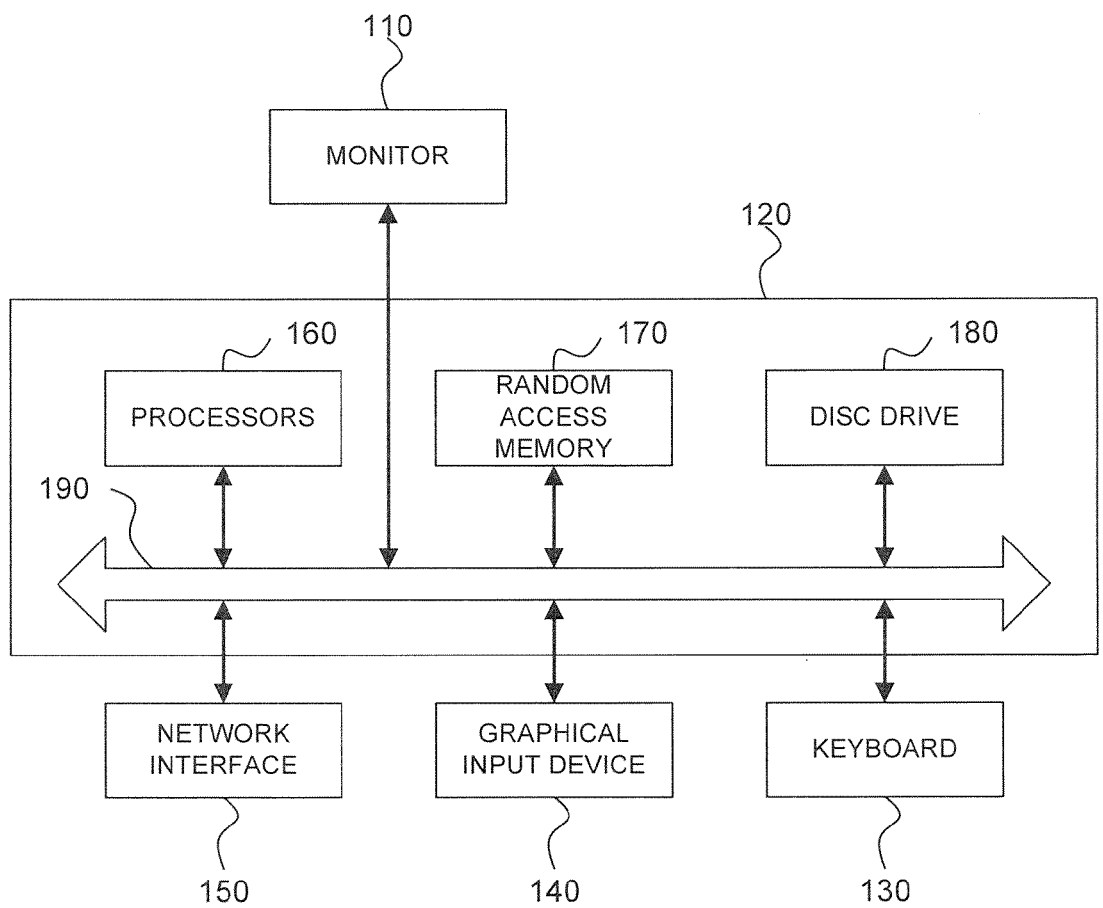
FIG. 5 illustrates a computer system according to one embodiment.

FIG. 5 illustrates a computer system according to one embodiment. Computer system 100 typically includes a monitor 110, a computer 120, a keyboard 130, a graphical input device 140, and a network interface 150. The graphical input device 140 includes a computer mouse, a trackball, a track pad, graphics tablet, touch screen, and/or other wired or wireless input devices that allow users to create or select graphics, objects, icons, and/or text appearing on the monitor 110. Embodiments of network interface 150 typically provides wired or wireless communication with an electronic communications network, such as a local area network, a wide area network (for example, the Internet) and/or virtual networks (for example a virtual private network (VPN)).

Computer 120 typically includes components such as one or more general-purpose processors 160, and memory storage devices such as RAM 170, disk drives 180, and system bus 190 interconnecting the above components. RAM 170 and disk drive 180 are examples of tangible media (e.g., computer readable media) for storage of data, audio/video files, computer programs, applet interpreters or compilers, and virtual machines. For example, RAM 170 and/or disk drive 180 may store a computer program that when executed causes computer 120 to perform an embodiment of the method of the present invention. Further embodiments of computer 120 can include specialized input, output, and communications subsystems for configuring, operating, testing, and communicating with programmable devices. Other types of tangible media include floppy disks, removable hard disks, optical storage media (such as digital versatile disks read-only memory (DVD-ROMs), CD-ROMs, and barcodes), non-volatile memory devices (such as flash memories, ROMs, and battery-backed volatile memories), and networked storage devices. These tangible media may also store a computer program that when executed causes a computer to perform an embodiment of the method of the present invention.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method of estimating the interlacing mode used in a series of video frames presented as a sequence of fields, the method comprising: calculating a metric indicative of a difference between a current field of the sequence and a previous field of the sequence, wherein the calculating is performed by a field comparator; and determining from the metric the most likely type of the current field by reference to a Hidden Markov Model, wherein the metric indicative of the difference between the current field of the sequence and the previous field of the sequence is a function of the difference between the current field and the previous field and a difference between the current field and a corresponding field of a previous frame of the series.

2. A method according to claim 1, wherein the metric comprises a ratio of the difference between the current field and the previous field and the difference between the current field and the corresponding field of the previous frame of the series.

3. A method according to claim 1, wherein the Hidden Markov Model is configured with transition probabilities based on a priori knowledge of a sequence of video frames.

4. A method according to claim 1, wherein the Hidden Markov Model is configured to learn transition probabilities from a known training sequence of video frames.

5. A method according to claim 1, wherein the probability that the current field is of a given type is calculated by performing a forward algorithm.

6. A method according to claim 1, wherein a decision that the current field is of a given type is made by determining a most likely hidden path through the Hidden Markov Model given an observed sequence of difference metrics.

7. A method according to claim 1 further comprising comparing a stored future field of the sequence with the current field of the sequence.

8. A method according to claim 1 further comprising calculating the probability that a next field of the sequence will be of a given type.

9. A non-transitory machine readable medium containing instructions for causing data processing equipment to perform a method according to claim 1.

10. Apparatus for estimating the interlacing mode used in a series of video frames presented as a sequence of fields, the apparatus comprising: a field comparator for calculating a metric indicative of a difference between a current field of the sequence and a previous field of the sequence; and a field type selector for determining from the metric the most likely type of the current field, by reference to a Hidden Markov Model, wherein the field comparator is configured to calculate a function of the difference between the current field and the previous field and a difference between the current field and a corresponding field of a previous frame of the series.

11. Apparatus according to claim 10, wherein the field comparator is configured to calculate a ratio of the difference between the current field and the previous field and the difference between the current field and the corresponding field of the previous frame of the series.

12. Apparatus according to claim 10, wherein the Hidden Markov Model is configured with transition probabilities based on a priori knowledge of a sequence of video frames.

13. Apparatus according to claim 10, wherein the Hidden Markov Model is configured to learn transition probabilities from a known training sequence of video frames.

14. Apparatus according to claim 10, wherein the field type selector is configured to perform a forward algorithm to calculate the probability that the current field is of a given type.

15. Apparatus according to claim 10, wherein the field type selector is configured to determine a most likely hidden path through the Hidden Markov Model given an observed sequence of difference metrics to make a decision that the current field is of a given type.

16. Apparatus according to claim 10 further comprising a frame buffer for storing a future field of the sequence.

17. A field programmable gate array (FPGA) implementing an apparatus according to claim 10.

18. A de-interlacer comprising an apparatus according to claim 10.

* * * * *